A. P. LUNDIN.
BICYCLE PUMP LOCK.
APPLICATION FILED MAR. 27, 1918. RENEWED APR. 25, 1919.
1,329,784. Patented Feb. 3, 1920.
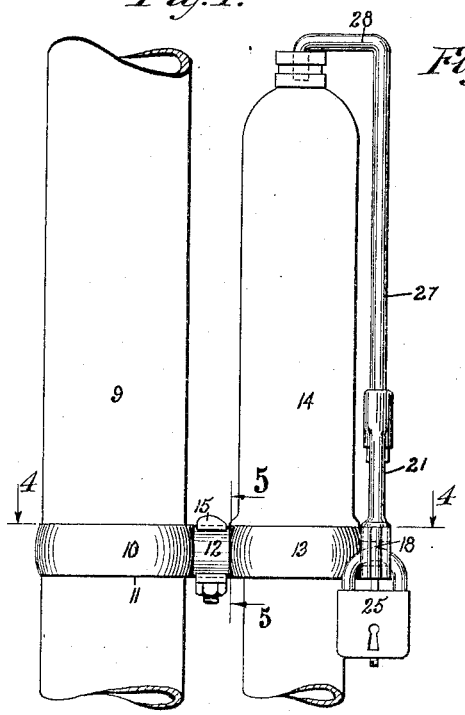
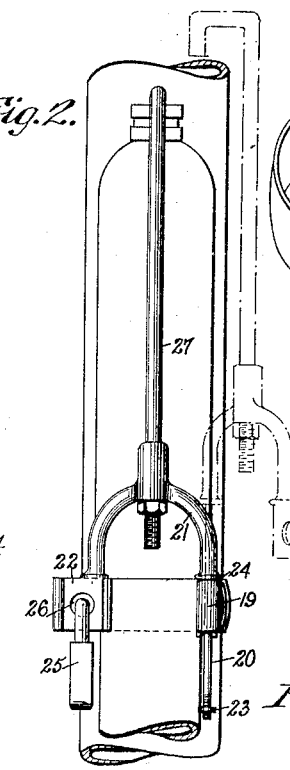
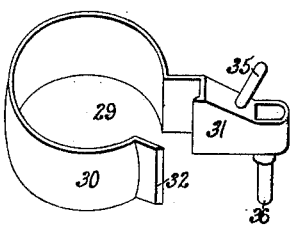
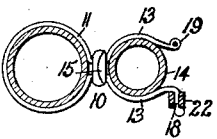
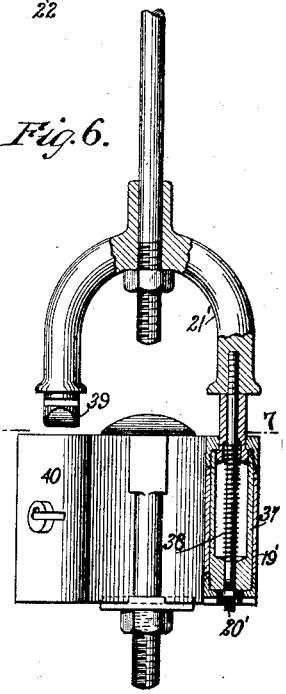
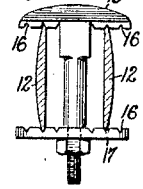
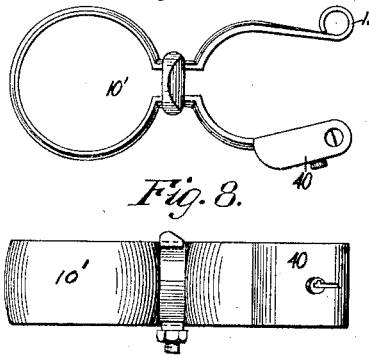
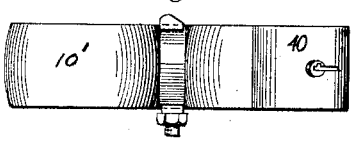
WITNESSES
Frank L. Faggiani
B. Joffe
INVENTOR
Adolph Per Lundin
BY
ATTORNEYS

UNITED STATES PATENT OFFICE.

ADOLF PER LUNDIN, OF BEZ VALLEY, JOHANNESBURG, TRANSVAAL, SOUTH AFRICA.

BICYCLE-PUMP LOCK.

1,329,784. Specification of Letters Patent. Patented Feb. 3, 1920.

Application filed March 27, 1918, Serial No. 225,125. Renewed April 25, 1919. Serial No. 292,699.

*To all whom it may concern:*

Be it known that I, ADOLF PER LUNDIN, a citizen of Transvaal, South Africa, residing in Bez Valley, Johannesburg, Transvaal, South Africa, have invented a new and Improved Bicycle-Pump Lock, of which the following is a full, clear, and exact description.

My invention relates to a support and lock for bicycle hand pumps and has reference more particularly to a contrivance whereby the bicycle pump can be firmly secured to a bicycle or motorcycle frame and the securing means will lock the pump and thereby prevent either an accidental disengagement of the pump with the supporting means or an unscrupulous person from removing the same from the support.

An object of the invention is to provide a simple, uncumbersome and inexpensive device which can be easily attached to a frame of a bicycle or motorcycle.

Another object of the invention is to provide clamping means which are adapted to support the pump and which have securing means in the restricted part of the clamps.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a fragmentary elevation of a bicycle frame equipped with a pump support and lock embodying my invention;

Fig. 2 is an end elevation of the support and pump secured thereby, the dotted position indicating the lock open so that the stem may be removed from the supporting means;

Fig. 3 is a perspective view of the clamp or clip for supporting the tip end of the bicycle pump;

Fig. 4 is a cross section on line 4—4, Fig. 1;

Fig. 5 is a cross section on line 5—5, Fig. 1;

Fig. 6 is a part elevation and part section of a pump lock of a modified construction;

Fig. 7 is a horizontal section on line 7—7, Fig. 6; and

Fig. 8 is a side elevation of the structure shown in Fig. 7.

Referring to the drawings, 9 is a tubular frame of a bicycle or motorcycle to which a clamp or a clip 10 is secured by means of a ring 11 open at cheeks 12 which extend from the ring to an arcuate branch 13 forming a yielding bracket or support for a pump 14. The ring is locked to the frame 9 by means of a bolt 15 the head of which is elongated and provided with indentations 16 for engaging the edges of the cheeks. A washer 17 with similar indentations 16 is provided on the bolt for engaging the lower edges of the cheeks. These indentations permit the locking of the ring on tubular frames of varying diameters, as will be seen from Fig. 5. By locking the cheeks by means of the bolt 15 the rigidity of the bracket of the clip is also increased at the cheeks.

One of the branches 13 of the bracket has an end flange and the other branch has a socket 19 at the end. A shank 20 is mounted to slide and turn in the socket 19. This shank forms one end of a fork 21, the other end 22 of which fork is bifurcated to fit over the flange 18 when the same alines therewith. The sliding movement of the stem is limited by a threaded member 23 provided at the extremity of same and a collar 24 provided on the fork. The sliding movement of the fork may be prevented by a lock 25 for which registering apertures 26 are provided in the flange and bifurcated end 22 of the fork. The fork 21 has a stem 27 the upper end of which is shaped into a hook 28 for entering the other end of the pump 14. The lower end of the pump is preferably in threaded engagement with the fork so that the length of the portion above the fork may be varied to suit pumps of different sizes.

The lower end of the pump is supported by a clip 29 secured to the frame 9. This clip is also secured by an open ring 30 one cheek of which extends from the ring and carries a block 31 the other cheek 32 of which is maintained in proximity to the cheek carrying the block by means of a bolt 33 similar to the bolt 15 and carrying a similar washer. One face of the block 31 is beveled so as to be properly disposed for a universal pump tip 34 which is disposed obliquely from the pump, as will be noted from Figs. 1 and 2. A suitable pin 35 is provided on the block for entering the tip and thereby locking the pump between the hook 28 and the clip 29. A pin 36 is also provided on the straight face of the block so that the same may enter the lower end of the pump if it is not provided with a special or universal tip. When the pin 36 is to be used in place of the pin 35 the clip 29 is inverted. It is self-evident that the clip 29 and the clip 10 form a pair for pumps of the same size.

In the modified form of the locking means, shown in Figs. 6 to 8 inclusive, the socket 19' carries therein revolubly a sleeve 37 in which the shank 20' of the fork 21' is mounted to slide and turn. The shank carries a spring 38 which normally forces the shank out of the sleeve thereby disengaging the other end 39 of the fork from the lock 40 which takes the place of the flange 18 on the other branch of the bracket. This locking means, therefore, forms an integral part of the clip 10'. It makes a more expensive article but it answers the same purpose as the structure described and disclosed in Figs. 1 to 5 inclusive. The advantage of the preferred structure shown in Figs. 1 to 5 is that the lock can be selected by the owner to suit himself; and, further, it would permit the use of the padlock 25 for locking the chain of the bicycle, which prevents the use of same by unauthorized persons.

When the pump is to be locked to the bicycle the branches 13 of the clip are disengaged from the fork 21, and, therefore, by placing the lower end of the pump on the block 31 and forcing said pump between the branches 13, the pump will snap therebetween and be retained by the clip 10. The fork 21 can then be raised and turned to bring the hook 28 into engagement with the upper end of the pump. It is evident that the length of the stem 27 can be varied by means of its threaded engagement with the fork so as to adapt it to pumps of different lengths and thereby prevent any rattling of same when in locked position. When the bifurcated end of the fork is engaged by the flange 18 of the clip, it may be locked by means of the padlock, as previously described, thereby preventing an accidental movement of the fork 21 and also tampering with same by unauthorized persons.

I claim:

1. In combination, a bicycle pump, a clamp having means for engaging the lower end of the pump, a second clamp into which the pump may be snapped and a member bridging the opening through which the pump can be snapped into the clamp, said member having means for engaging the upper end of the pump when bridging said clamp, and means for locking said member to the clamp.

2. In combination, a bicycle pump, a clamp having means for engaging the lower end of the pump, a second clamp into which the pump is adapted to snap, a member connected to said second clamp to bridge the same so as to prevent the removal of the pump from the clamp, means for locking said member to the clamp in the bridging position, and a stem that can be varied in length extending from said member for engaging the upper end of the pump whereby a longitudinal displacement of the pump is prevented.

3. In combination, a bicycle pump, means for supporting the lower end of the pump, a clamp for holding the pump, means carried by said clamp for engaging the upper end of the pump so as to retain the same on the means which support the lower end of the pump, and means for locking the upper pump end engaging means to its carrying clamp.

4. In combination, a bicycle pump, a clamp having means for supporting the lower end of the pump, a second clamp having means for yieldingly retaining the pump, means for locking the pump in the yielding means, and an extension from said locking means for engaging the upper end of the pump.

5. In combination, a bicycle pump, a clamp having means for engaging the lower end of the pump, a second clamp into which the pump is adapted to snap, a member for bridging the clamp so as to lock the pump therein, said member being connected with one end to the clamp so as to slide vertically and turn horizontally, means for locking the other end of the member to the clamp, and an extension from said member for engaging the other end of the pump.

6. A pump locking means, comprising in combination; pump holding bands formed into a clamp, a lock secured to the pump holding bands, and a cylindrical guide secured to the pump holding bands, and a retaining rod adapted to engage a pump and be lockably connected with the lock and cylindrical guide.

7. A lock for holding a pump, comprising in combination; a pair of clamp bands adapted to be locked upon a bicycle frame, a bolt provided with a serrated head and washer engaged with the clamp bands, and the clamp bands shaped to receive a pump, a cylindrical guide attached to one band, and a lock attached to the other, a lock yoke pivotally confined in the cylindrical guide and adapted to be secured in fixed engagement with the lock, and a pump retaining rod provided to lockably engage a pump.

8. A lock for securing a bicycle pump to a bicycle, comprising in combination; a pair of clamping bands locked upon a bicycle frame, a lock attached to one band, and a cylindrical guide attached to the other band, the band shaped to receive the cylindrical body of a pump, a lock yoke pivotally retained within the cylindrical guide, and lockably engaged with the lock, a retaining rod fixed to the lock yoke, and a locking pin formed on the retaining rod for engaging an aperture in the pump.

9. A lock for securing a bicycle pump to a bicycle, comprising in combination; a band placed around the bicycle frame, said band shaped to receive the bicycle pump, a lock carried by the band, and a retaining means adapted to engage with a bicycle pump and the lock.

10. A lock to secure a pump to a bicycle, comprising in combination; a band clamped around a bicycle bar, a cylindrical guide attached to the band, a lock yoke rotatably carried by the cylindrical guide and provided with a forked leg adapted to engage the clamp band, and a pad-lock adapted to lock the forked leg to the band.

11. A lock to secure a pump to a bicycle, comprising in combination; a band clamped around a bicycle bar, a cylindrical guide attached to the band, a lock yoke rotatably carried by the cylindrical guide and provided with a forked leg adapted to engage the clamp band, and a pad-lock adapted to lock the forked leg to the band, and a bolt with a serrated head and washer engaging the band to lock said band to the said bicycle frame.

ADOLF PER LUNDIN.